(12) United States Patent
Lara-Curzio et al.

(10) Patent No.: US 8,017,273 B2
(45) Date of Patent: Sep. 13, 2011

(54) LIGHTWEIGHT, DURABLE LEAD-ACID BATTERIES

(75) Inventors: Edgar Lara-Curzio, Lenoir City, TN (US); Ke An, Knoxville, TX (US); James O. Kiggans, Jr., Oak Ridge, TN (US); Nancy J. Dudney, Knoxville, TN (US); Cristian I. Contescu, Knoxville, TN (US); Frederick S. Baker, Oak Ridge, TN (US); Beth L. Armstrong, Clinton, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 727 days.

(21) Appl. No.: 12/110,913

(22) Filed: Apr. 28, 2008

(65) Prior Publication Data

US 2009/0269666 A1    Oct. 29, 2009

(51) Int. Cl.
*H01M 4/14* (2006.01)
*H01M 4/16* (2006.01)
(52) U.S. Cl. ........................... 429/233; 429/225
(58) Field of Classification Search .................. 429/225, 429/233
See application file for complete search history.

(56) References Cited

U.S. PATENT DOCUMENTS

| | | | |
|---|---|---|---|
| 3,852,113 A | | 12/1974 | Yokota et al. |
| 3,880,728 A | * | 4/1975 | Habermann et al. .......... 205/188 |
| 4,026,725 A | | 5/1977 | Sutula |
| 4,134,192 A | | 1/1979 | Parkinson et al. |
| 4,162,352 A | | 7/1979 | Sutula et al. |
| 4,215,190 A | | 7/1980 | Ferrando et al. |
| 4,356,242 A | | 10/1982 | Doniat |
| 4,476,206 A | * | 10/1984 | Viala et al. ..................... 429/234 |
| 4,589,999 A | | 5/1986 | Vasta |
| 4,713,306 A | | 12/1987 | Pinsky et al. |
| 4,777,083 A | | 10/1988 | Ono et al. |
| 4,861,690 A | | 8/1989 | Ope et al. |
| 4,865,933 A | | 9/1989 | Blanyer et al. |
| 5,114,812 A | | 5/1992 | Disselbeck et al. |
| 5,139,902 A | | 8/1992 | Drews et al. |
| 5,143,806 A | | 9/1992 | Bullock et al. |
| 5,156,806 A | | 10/1992 | Sutula et al. |

(Continued)

FOREIGN PATENT DOCUMENTS

CH        665429 A  *  5/1988

OTHER PUBLICATIONS

J. Garche, Phys. Chem, Chem. Phys (2001) 3 pp. 356-367.

*Primary Examiner* — Gregg Cantelmo
(74) *Attorney, Agent, or Firm* — Quarles & Brady LLP (57) ABSTRACT

A lightweight, durable lead-acid battery is disclosed. Alternative electrode materials and configurations are used to reduce weight, to increase material utilization and to extend service life. The electrode can include a current collector having a buffer layer in contact with the current collector and an electrochemically active material in contact with the buffer layer. In one form, the buffer layer includes a carbide, and the current collector includes carbon fibers having the buffer layer. The buffer layer can include a carbide and/or a noble metal selected from of gold, silver, tantalum, platinum, palladium and rhodium. When the electrode is to be used in a lead-acid battery, the electrochemically active material is selected from metallic lead (for a negative electrode) or lead peroxide (for a positive electrode).

23 Claims, 8 Drawing Sheets

U.S. PATENT DOCUMENTS

| | | | |
|---|---|---|---|
| 5,197,993 | A | 3/1993 | Ferrando et al. |
| 5,362,580 | A | 11/1994 | Ferrando et al. |
| 5,434,024 | A | 7/1995 | Ikeda et al. |
| 5,443,928 | A | 8/1995 | Takeuchi et al. |
| 5,468,570 | A | 11/1995 | Ferrando |
| 5,521,029 | A | 5/1996 | Fiorino et al. |
| 5,536,598 | A | 7/1996 | LaFollette |
| 5,582,622 | A | 12/1996 | LaFollette |
| 5,584,109 | A | 12/1996 | DiGiovanni et al. |
| 5,612,155 | A | 3/1997 | Takami et al. |
| 5,670,278 | A | 9/1997 | Disselbeck et al. |
| 5,677,088 | A | 10/1997 | Kobayashi |
| 5,824,120 | A | 10/1998 | Mitchell et al. |
| 6,228,533 | B1 | 5/2001 | Ohashi et al. |
| 6,232,017 | B1 | 5/2001 | Tsuchida et al. |
| 6,251,540 | B1 | 6/2001 | Kejha |
| 6,265,112 | B1 | 7/2001 | Britton |
| 6,332,900 | B1 | 12/2001 | Muffoletto et al. |
| 6,361,900 | B1 | 3/2002 | Parmentier et al. |
| 6,428,674 | B1 | 8/2002 | Imhof et al. |
| 6,458,484 | B2 | 10/2002 | Ohms et al. |
| 6,528,211 | B1 | 3/2003 | Nishimura et al. |
| 6,558,839 | B2 | 5/2003 | Imhof et al. |
| 6,632,570 | B2 | 10/2003 | Imhof et al. |
| 6,699,620 | B2 | 3/2004 | Zhang et al. |
| 6,706,432 | B2 | 3/2004 | Oehr et al. |
| 6,733,926 | B2 | 5/2004 | Muffoletto et al. |
| 6,844,114 | B2 | 1/2005 | Gauthier et al. |
| 6,979,513 | B2 | 12/2005 | Kelley et al. |
| 7,033,703 | B2 | 4/2006 | Kelley et al. |
| 7,060,391 | B2 | 6/2006 | Gyenge et al. |
| 7,105,252 | B2 | 9/2006 | Kelley et al. |
| 7,147,966 | B2 | 12/2006 | Ren et al. |
| 7,241,533 | B1 | 7/2007 | Ikeda et al. |
| 2003/0165741 | A1 | 9/2003 | Maly-Schreiber et al. |
| 2003/0170543 | A1 | 9/2003 | Headrick et al. |
| 2004/0002006 | A1 | 1/2004 | Kelley et al. |
| 2004/0151982 | A1 | 8/2004 | Shivashankar et al. |
| 2005/0277024 | A1 | 12/2005 | West et al. |
| 2006/0019819 | A1 | 1/2006 | Shao-Horn et al. |
| 2007/0007239 | A1 | 1/2007 | Lee et al. |

\* cited by examiner

Figure 3
Engineered buffer layer between fibers and active material

Pb + Ti + C sintered @ 850°C/16 hrs

Figure 4

Engineered buffer layer between fibers and active material
Pb + Ti + C sintered @ 850°C/16 hrs
X-ray diffraction pattern revealing the presence of Pb, $Ti_2PbC$ and Pb-Ti compounds

Figure 5
Engineered Buffer Layer Between Fibers And Active Material

Figure 6

Engineered Buffer Layer Between Fibers And Active Material

Figure 8

Charge/Discharge of battery containing $PbO_2$-coated $Ti_3SiC_2$

US 8,017,273 B2

LIGHTWEIGHT, DURABLE LEAD-ACID BATTERIES

STATEMENT REGARDING FEDERALLY SPONSORED RESEARCH

This invention was made with government support under Contract No. DE-AC05-00OR22725 awarded by the U.S. Department of Energy. The government has certain rights in the invention.

CROSS-REFERENCES TO RELATED APPLICATIONS

Not Applicable.

BACKGROUND OF THE INVENTION

1. Field of the Invention

This invention relates to a durable, lightweight lead-acid battery. Significant weight savings can be achieved by using carbon fiber structures to fabricate the grid/current collectors, and by maximizing the surface area-to-volume ratio of the active materials. To promote long-term durability, the interfaces between the grid/current collectors and the active materials are tailored with buffer layers, to ensure adhesion and to minimize increases in electrical resistance that might result from the formation of interfacial phases during cyclic charging and discharging.

2. Description of the Related Art

The low specific energy of lead-acid batteries has limited their use in electric and hybrid-electric vehicle applications and other mobile and portable applications, where the weight of the battery is critical to meeting efficiency goals. Specifically, it has been reported that the 100% theoretical specific energy of lead-acid batteries (167 Whkg$^{-1}$) is lowered to 65% theoretical (109 Whkg$^{-1}$) by limited mass utilization, further lowered to 51% theoretical (85 Whkg$^{-1}$) by acid dilution, further lowered to 39% theoretical (65 Whkg$^{-1}$) by acid surplus, and further lowered to 20% theoretical (33 Whkg$^{-1}$) by inactive components. (See J. Garche, *Phys. Chem, Chem. Phys* (2001) 3 pp. 356-367.) Among these factors, mass utilization (35% reduction) and the weight of inactive components (19% reduction) are the two most significant factors.

It has been recognized that the electrode grids of conventional lead-acid batteries are relatively heavy due to the use of lead and lead alloys which have a density of about 11 g/cm$^3$. Accordingly, alternate lighter electrode grid materials have been proposed for use in lead-acid batteries. For example, U.S. Patent Application Publication Nos. 2004/0191632 and 2004/0002006 proposed a lead-acid battery having a current collector constructed of carbon foam; Gyenge et al. proposed the use of high-surface area reticulated vitreous carbon current collectors (see *Journal of Power Sources*, 113 (2003) pp. 388-395, and U.S. Pat. No. 7,060,391); Das et al. reported the discharge behavior of electrodeposited lead and lead peroxide onto cylindrical carbon rods (see *Journal of Power Sources*, 55 (1995) pp. 251-254; and *Journal of Power Sources*, 89 (2000) pp. 112-116); Viala et al. reported the manufacture of negative composite grid/current collectors using woven graphite, silicon carbide, glass or polypropylene fibers (see *Journal of Applied Electrochemistry* 15 (1985) pp. 421-429; *Materials Chemistry and Physics*, 13 (1985) pp. 393-408); Sutula et al. reported the use of alumina and carbon fibers embedded in lead to fabricate grid materials (see *Electrochemical Science & Technology*, 128, 10 (1981) pp. 2060-2064; *Electrochemical Science & Technology*, 129, 8 (1982) pp. 1749-1752); and Narasimham et al. electrodeposited lead peroxide onto cylindrical graphite substrates as a precursor for the production of inorganic chemicals (see *Journal of Applied Electrochemistry* 6 (1976) pp. 397-401).

It has also been recognized (see, for example U.S. Pat. No. 6,699,620) that the grid current collecting structure and active material of the positive plate of a lead-acid battery affect the life and current generating efficiency of a lead-acid battery. The cycling of positive plates leads to corrosion between the interface of the lead peroxide active material and the grid material (typically a lead alloy). The positive plates also expand and contract during the cycling. The combination of expansion, contraction, and corrosion reactions limits the life of the positive plate. After exposure of positive plate to cycling, the lead peroxide active material can separate from the grid resulting in a loss of electrical continuity at the interface between grid and the active material.

Therefore, there is still a need for an electrode for a lead-acid battery that reduces the weight of the battery and that minimizes the loss of electrical continuity at the interface between the grid and the active material.

SUMMARY OF THE INVENTION

The foregoing needs are met by a battery electrode according to the present invention. The invention uses carbon fiber structures (e.g., woven graphite fiber structures) to fabricate the grid/current collectors to achieve significant weight savings. The invention also maximizes the surface area-to-volume ratio of the active materials. In the invention, the interfaces between the grid/current collectors and the active materials are tailored with engineered buffer layers to ensure adhesion and to minimize increases in electrical resistance that might result from the formation of interfacial phases during cyclic charging and discharging.

In one aspect, the invention provides an electrode for an electrochemical cell. The electrode includes a current collector having a buffer layer in contact with the current collector and an electrochemically active material in contact with the buffer layer. In one form, the buffer layer includes a carbide, and the current collector includes carbon fibers having the buffer layer. In a preferred form, the current collector consists essentially of carbon fibers having the buffer layer. By limiting the current collector to carbon fibers having the buffer layer, the low density (about 1.75 g/cm$^3$), thermal conductivity, and good electrical conductivity of the carbon fibers can be exploited without the addition of other filler material such as non-conducting synthetic fibers or glass fibers that could limit the electrical conductivity or adversely affect the thermal conductivity of the current collector. When the buffer layer is a carbide, suitable carbides may include lead. One example carbide is a ternary carbide including lead and a transition metal, such as titanium, zirconium, hafnium, and mixtures thereof.

An electrode according to the invention may be used in an electrochemical cell such as a lead-acid battery cell. In a lead-acid battery, each cell includes in the charged state at least one electrode including electrochemically active metallic lead and at least one electrode including electrochemically active lead peroxide (PbO$_2$) in an electrolyte of sulfuric acid (H$_2$SO$_4$). In the discharged state, the active phases in both electrodes turn into lead sulfate (PbSO$_4$), which depletes the sulfuric acid concentration of the electrolyte (reflected by a lower specific gravity of the electrolyte). A separator is used between the positive electrode and the negative electrode of a lead acid battery to prevent short circuit through physical contact. Various types of lead-acid batteries are known such as wet cell batteries and valve regulated lead acid batteries (e.g., absorbed glass mat batteries or gelled electrolyte batteries). A conventional lead-acid battery includes a grid current collecting structure (typically a lead alloy) that supports the electrochemically active material of the positive electrode and the negative electrode. In the present invention, the lead alloy grid current collecting structure of the lead-acid battery is replaced with a current collector including carbon fibers having the buffer layer. The current collector including carbon fibers can be formed into shapes suitable for use in a lead-acid battery such as individual rectangular plate-like forms or spiral wound forms.

The carbon fiber used in an electrode according to the invention can be in the form of a woven cloth, or a non-woven material such as a consolidation of carbon fibers. The carbon fiber used in an electrode according to the invention is not limited to any specific type of carbon fiber. In this regard, the carbon fibers can be made by the oxidation and thermal pyrolysis of polyacrylonitrile (PAN), or can be manufactured using pitch or rayon fibers as the precursor instead of PAN, or can be manufactured by other methods. The invention is not limited to any particular atomic structure of the carbon fibers. Specifically, amorphous carbon, or crystalline carbon, or mixtures thereof may be used for the carbon fibers.

An electrode according to the invention can also be a bipolar electrode. In this embodiment, some of the carbon fibers have a layer of a first electrochemically active material in contact with the buffer layer, and some of the carbon fibers have a layer of a second electrochemically active material in contact with the buffer layer. For example, the first electrochemically active material can be metallic lead of the negative electrode of a lead-acid battery, and the second electrochemically active material can be lead peroxide for the positive electrode of a lead-acid battery.

In another aspect, the invention provides an electrode for an electrochemical cell. The electrode includes a current collector having carbon fibers with a buffer layer in contact with the carbon fibers. The carbon fibers used in the electrode can be in the form of a woven cloth, or a non-woven material such as a consolidation of random carbon fibers. The buffer layer can include a noble metal such as gold, silver, tantalum, platinum, palladium, rhodium, and mixtures thereof. Some or all of the carbon fibers have the buffer layer. For example, certain fibers may not be coated with the buffer layer to facilitate connection to a battery terminal. Some or all of the carbon fibers have a layer of an electrochemically active material in contact with the buffer layer. For example, certain fibers may not be coated with the active material to facilitate connection to a battery terminal. An electrode according to this aspect of the invention may be used in an electrochemical cell such as a lead-acid battery cell. The lead alloy grid current collecting structure of the lead-acid battery is replaced with a current collector including carbon fibers having the buffer layer. The negative electrode can include metallic lead deposited on the buffer layer of carbon fibers, and the positive electrode can include lead peroxide deposited on the buffer layer of carbon fibers.

In yet another aspect, the invention provides an electrode for an electrochemical cell. The electrode includes a current collector including carbon fibers having a diameter from about 3 to about 10 microns. The carbon fibers used in the electrode can be in the form of a woven cloth, or a non-woven material such as a consolidation of random carbon fibers. Some or all of the carbon fibers have a layer of an electrochemically active material in contact with the carbon fibers. For example, certain carbon fibers may not be coated with the active material to facilitate connection to a battery terminal. The layer of electrochemically active material has a thickness from about 0.5 to about 10 microns. In a preferred form, the current collector consists essentially of carbon fibers. When used in a lead-acid battery, the negative electrode includes a layer of metallic lead deposited on the carbon fibers, and the positive electrode includes a layer of lead peroxide deposited on the carbon fibers. The thin, uniform layers of active materials can be electrodeposited onto the carbon fiber structure grid/current collector. Because the operation of lead-acid batteries is based on the surface reaction between the active materials and the electrolyte, and this reaction only takes place within a few microns of the surface of the active materials, weight optimization is achieved by using layers of active materials that are barely thicker than the thickness of active material that participates in the chemical reactions.

In still another aspect, the invention provides an electrode for an electrochemical cell. The electrode includes a current collector including carbon fibers having a diameter from about 3 to about 10 microns. The carbon fibers used in the electrode can be in the form of a woven cloth, or a non-woven material such as a consolidation of random carbon fibers. Some or all of the carbon fibers have a buffer layer in contact with the carbon fibers. The buffer layer can have a thickness from about 0.5 to about 10 microns. The buffer layer is in contact with an electrochemically active material having a thickness from about 0.5 to about 10 microns. When used in a lead-acid battery, the negative electrode includes a layer of metallic lead deposited on the buffer layer of carbon fibers, and the positive electrode includes a layer of lead peroxide deposited on the buffer layer of carbon fibers. The buffer layer can include a carbide and/or a noble metal selected from of gold, silver, tantalum, platinum, palladium and rhodium.

In yet another aspect, the invention provides a method for making an electrode for an electrochemical cell. In the method, a buffer layer is deposited on carbon fibers. The carbon fibers used in the method can be in the form of individual fibers, a woven cloth, or a non-woven material such as a consolidation of randomly oriented carbon fibers. Thus, individual fibers, a woven cloth, or a non-woven material (e.g., with random fiber distribution) may be coated with the buffer layer. The buffer layer can include a carbide and/or a noble metal selected from of gold, silver, tantalum, platinum, palladium and rhodium. An electrochemically active material is deposited (preferably electrodeposited) on the buffer layer on some or all of the carbon fibers. When the electrode is to be used in a lead-acid battery, the electrochemically active material is selected from metallic lead (for a negative electrode) or lead peroxide (for a positive electrode). Individual fibers having the buffer layer, a woven cloth having the buffer layer, or a non-woven material having the buffer layer may be coated with the active material. When coating individual fibers, the fibers may be consolidated (such as by compression in a mold in a specific fiber orientation, e.g., longitudinal fiber orientation, or alternatively in a random fiber orientation) into an electrode structure after deposition of the buffer layer and electrochemically active material. The consolidated carbon fibers having the buffer layer and the electrochemically active material can form a porous electrode structure having a high surface area to volume ratio that allows for optimized electrochemically active material utilization.

When a method according to the invention is used to make a bipolar electrode, some of the carbon fibers have a layer of the first electrochemically active material in contact with the buffer layer, and some of the carbon fibers have a layer of a second electrochemically active material in contact with the buffer layer. For example, the first electrochemically active material can be metallic lead of the negative electrode of a lead-acid battery, and the second electrochemically active material can be lead peroxide for the positive electrode of a lead-acid battery.

Thus, it is an advantage of the present invention to provide a durable, lightweight lead-acid battery by reducing weight by replacing lead alloy grids with carbon fibers, and by taking advantage of the large surface area of the fibers.

It is another advantage to provide a durable, lightweight lead-acid battery by improving durability through engineered buffer layers between carbon fibers and active materials.

It is yet another advantage to provide a durable, lightweight lead-acid battery by maximizing material utilization through the use of uniform thin active material layers, and by improving charging rates.

These and other features, aspects, and advantages of the present invention will become better understood upon consideration of the following detailed description, drawings and appended claims.

DETAILED DESCRIPTION OF THE INVENTION

An electrode according to the invention includes a carbon fiber structure used as the current collector. There are weight savings associated with the use of carbon materials to replace lead alloys for the construction of the grid/current collectors, which are currently used in most lead-acid batteries. In addition to its low density (about 1.75 g/cm$^3$), carbon fibers have the advantages of being chemically stable in sulfuric acid and of being good thermal and electrical conductors. The large surface area provided by carbon fibers is exploited in the invention. Carbon, and graphite fibers in particular, are attractive for this application because they expand and contract less than conventional lead alloys currently used as grid/current collectors. Like the lead alloys currently used as grid/current collectors, graphite fibers are resistant to the chemical environment in a lead-acid battery but graphite fibers are stiffer and stronger than these alloys.

In an embodiment of the invention, thin, uniform layers of active materials are electrodeposited onto the carbon fiber structure grid/current collector. Because the operation of lead-acid batteries is based on the surface reaction between the active materials and the electrolyte, and this reaction only takes place within a few microns of the surface of the active materials (see Codaro et al., "A Kinetic Study of the Electroformation of $PbO_2$ on Pb Electrodes in Sulphuric Acid Solutions," *Electrochemical Acta*, vol. 42, No. 4 pp. 549-555, 1997), weight optimization is achieved by using layers of active materials that are barely thicker than the thickness of active material that participates in the chemical reactions. In the positive electrode according to the invention for a lead-acid battery, each fiber is coated with a layer of lead peroxide, whereas in the negative electrode according to the invention for a lead-acid battery, each fiber is coated with metallic lead.

Because the durability of lead-acid batteries may be limited by loss of electrical continuity at the interface between the current collector/grid materials and the electrochemically active material phases, this invention addresses this potential problem by using buffer layers between the carbon or graphite fibers that serves as grid/current collector and the electrochemically active material layers. The role of such buffer layers is to ensure continuous electrical contact between the grid/current collector and the active material layers.

Figure 1:
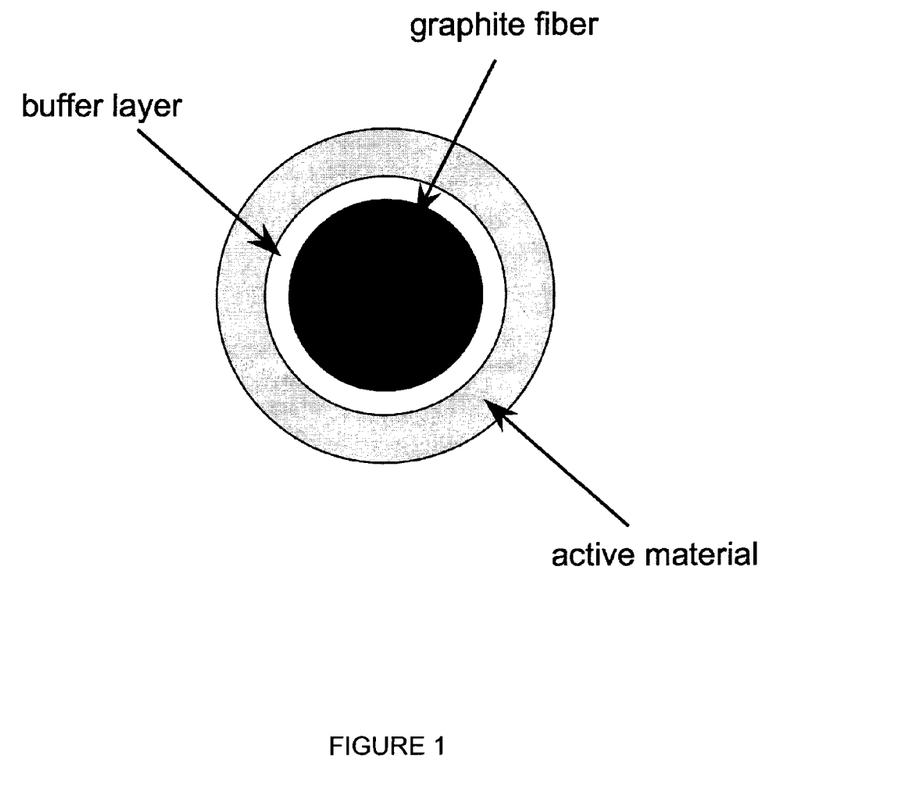
FIG. 1 is a schematic of an electrode structure according to the invention. The schematic is a cross-sectional view taken transverse to the longitudinal axis of the electrode.

Looking at FIG. 1, there is shown a schematic of an example electrode structure according to the invention. In this example embodiment, the cylindrical graphite fiber can have a diameter from about 3 to about 10 microns, the annular buffer layer a thickness from about 0.5 to about 10 microns, and the annular electrochemically active material can have a thickness from about 0.5 to about 10 microns. While FIG. 1 shows a single carbon fiber for the purposes of illustration, the carbon fibers that form an electrode structure may be incorporated into a non-woven or woven fabric, before or after deposition of the electrochemically active material.

Figure 2:
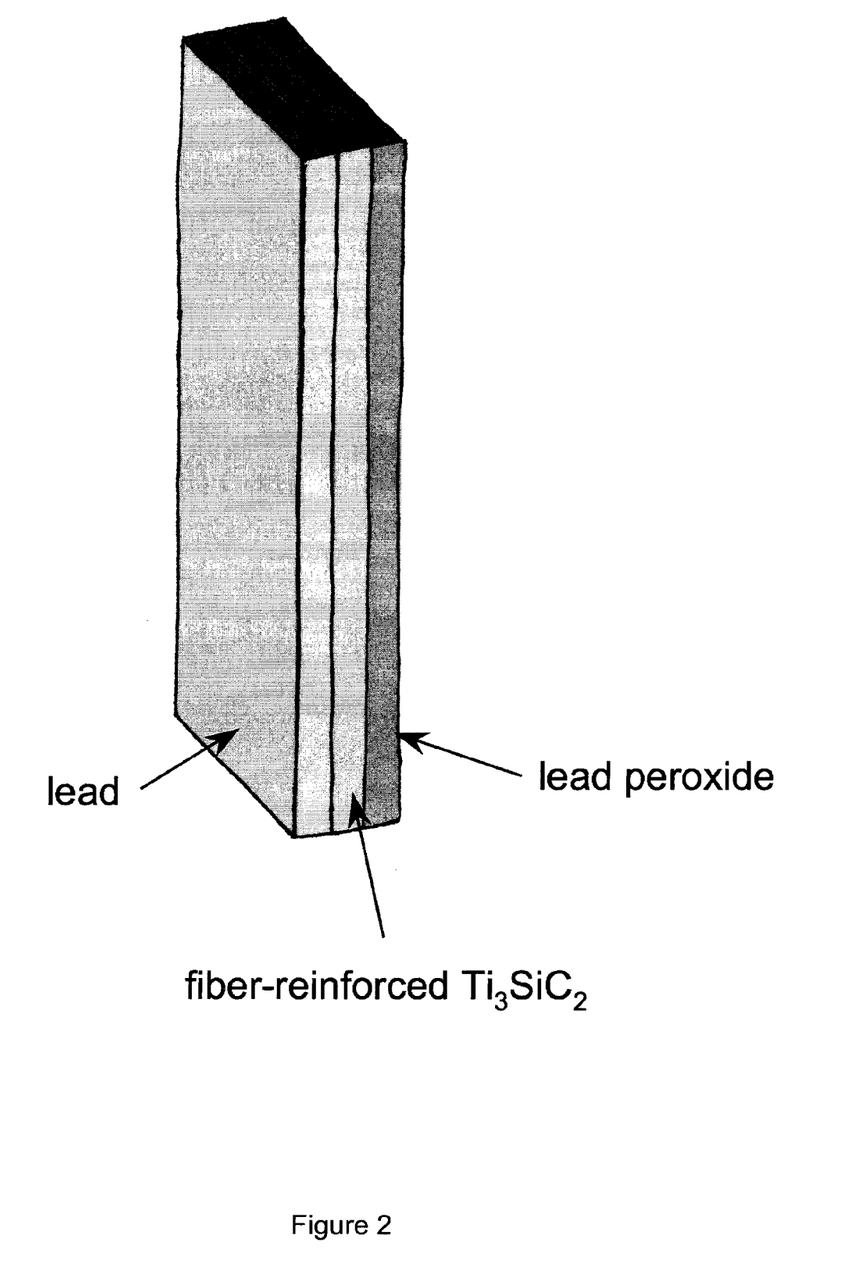
FIG. 2 is a schematic of a bipolar plate configuration for a lightweight lead-acid battery according to the invention.

FIG. 2 shows a schematic of a bipolar plate electrode configuration for a lightweight lead-acid battery according to the invention. Thin current collecting plates of carbide (e.g., $Ti_3SiC_2$ or $Ti_2PbC$) are reinforced with graphite fibers by densification of the materials; and metallic lead is electrodeposited on one side and lead peroxide is electrodeposited on the other side of the plate.

The buffer layer materials must be resistant to the battery electrochemical environment and must be compatible with carbon fibers and the active materials. The buffer layer materials can include, but are not limited to, noble metals such as gold, silver, tantalum, platinum, palladium, rhodium, and mixtures thereof. The buffer layer materials can also include, but are not limited to, carbides such as carbides including lead and/or a transition metal. Non-limiting examples include ternary carbides such as $Ti_3SiC_2$, $Ti_2PbC$, $Zr_2PbC$, and $Hf_2PbC$. $Ti_3SiC_2$ is a very attractive material for use as a buffer layer because: it has a density of 4.5 g/cm$^3$; it is resistant to sulfuric acid; it has high stiffness and strength, low coefficient of thermal expansion and both high thermal and electrical conductivity ($2-4 \times 10^6$ Ohm$^{-1}$m$^{-1}$). Therefore, the replacement of lead alloys, which have a density of about 11 g/cm$^3$ and an electrical conductivity of about $4.8 \times 10^6$ ohm$^{-1}$m$^{-1}$, with this ternary compound for the manufacture of grid current/collectors, would result in significant weight savings. $Ti_2PbC$ is also an attractive compound because it provides a means to ensure compatibility between the lead-based active phases and the graphite fibers. However, it has a higher density than $Ti_3SiC_2$ and it may require special processing conditions. Mixtures of carbides can also be used.

The buffer layer materials can be deposited onto graphite fibers by several techniques, including sputtering (see. e.g., et al., "Growth of $Ti_3SiC_2$ Thin Films by elemental Target Magnetron Sputtering," *J. Applied Physics*, 96, 9 (2004) pp. 4817-4826), evaporation, extrusion, electrodeposition and chemical vapor deposition (see, e.g., Pickering et al., "CVD of $Ti_3SiC_2$,"*Chem. Vap. Deposition*, 6, 6 (2000) pp. 289-295). The deposition of the buffer layer can be followed by electrodeposition of the active materials layers, which are lead and lead peroxide in a lead-acid battery. It is also possible to deposit materials that convert to active materials upon application of formation charging. For instance, red lead converts to lead peroxide upon formation charging. Thermal treatments can also be used to promote and to ensure adhesion with both the graphite fibers and the buffer layers. Other potential methods to synthesize the buffer layer include pack cementation and solution/slurry coating.

One example process to produce a durable, lightweight lead acid battery according to the present invention includes the following steps: (a) deposition of buffer layers of a carbide (e.g., $Ti_3SiC_2$ or $Ti_2PbC$) onto carbon fibers (e.g., pitch-based or PAN-based carbon fibers); and (b) electrodeposition of metallic lead onto the fibers coated with the buffer layer to prepare the negative electrode; (c) electrodeposition of lead peroxide onto the fibers coated with the buffer layer to prepare the positive electrode. The negative and positive electrodes can be placed on opposite sides of a separator (e.g., polyethylene or polypropylene) as is known, and suitable connectors can project to the negative and positive electrical terminals of the battery from the carbon fiber current carrying structure through the sulfuric acid electrolyte and electrochemical cell enclosure (e.g., a polypropylene battery case). The sulfuric acid electrolyte can be liquid, gelled or absorbed in glass mat.

One example process to produce bipolar plates according to the present invention includes the following steps: (a) densification of thin plates of $Ti_3SiC_2$ or $Ti_2PbC$ reinforced with graphite fibers (such as by sintering); and (b) electrodeposition of metallic lead on one side and lead peroxide on the other side of the plates. Suitable connectors can project to the electrical terminals of the battery from the woven graphite structure through the electrolyte and cell enclosure. Suitable seals can be used to fabricate stacks. Also, mechanical pressure (such as from separators and cell casings) can be used to counteract the dimensional changes associated with the conversion of lead peroxide into lead sulfate, which often leads to shedding of the active phases.

An electrode having a current collector including carbon fibers according to the invention may be used in other battery chemistries. For example, a current collector including carbon fibers can be coated with cadmium hydroxide as the active material for an electrode of a nickel cadmium battery, lanthanum nickel as the active material for an electrode of a nickel metal hydride battery, zinc hydroxide as the active material for an electrode of a nickel zinc battery, and iron hydroxide as the active material for an electrode of a nickel iron battery. In all of these nickel-based batteries, the electrochemically active material can be applied to the current collectors as, for example, a slurry, a paste, or any other appropriate coating material or method.

EXAMPLES

The following Examples have been presented in order to further illustrate the invention and are not intended to limit the invention in any way.

Figure 3:
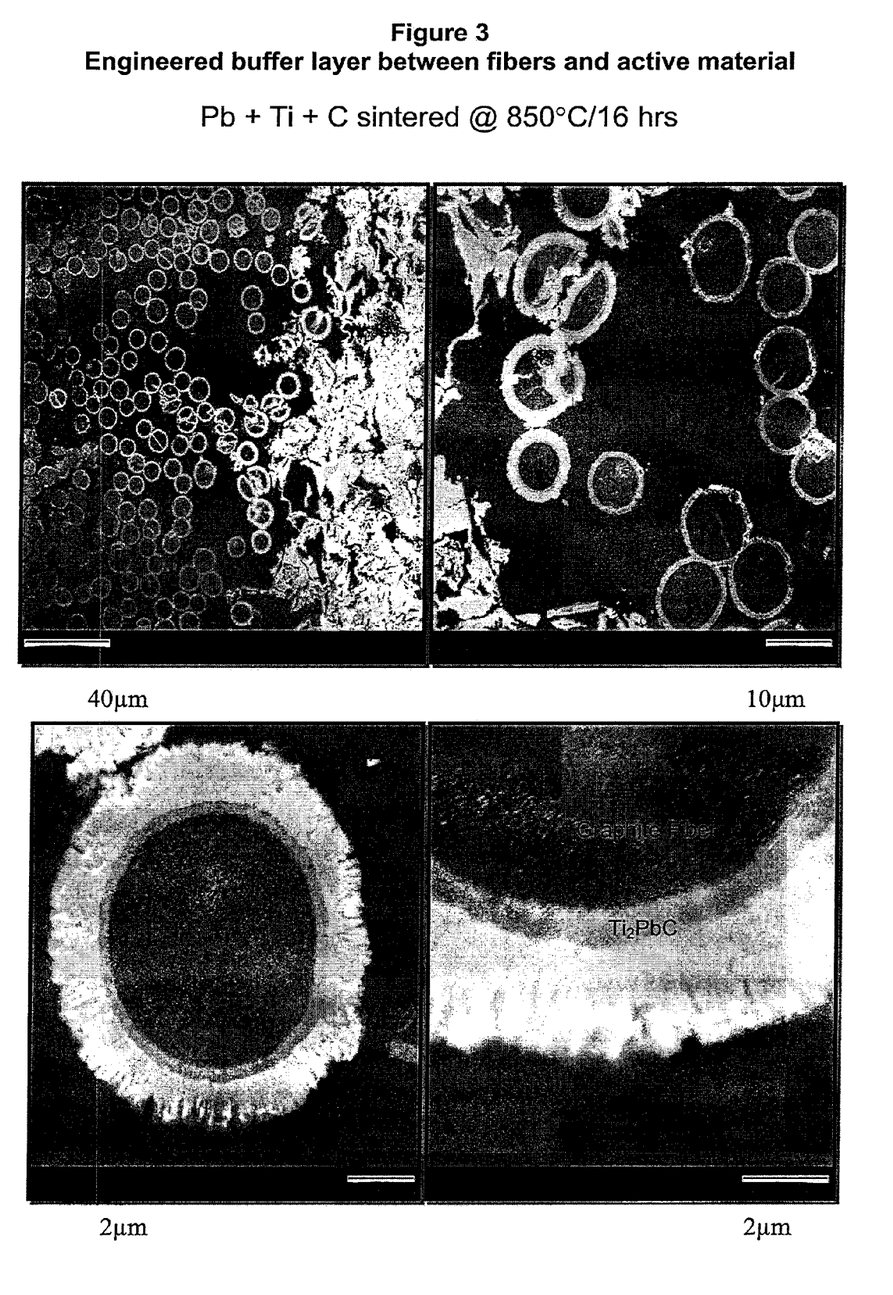
FIG. 3 shows photographs of an engineered $Ti_2PbC$ buffer layer synthesized onto graphite fibers.
Figure 4:
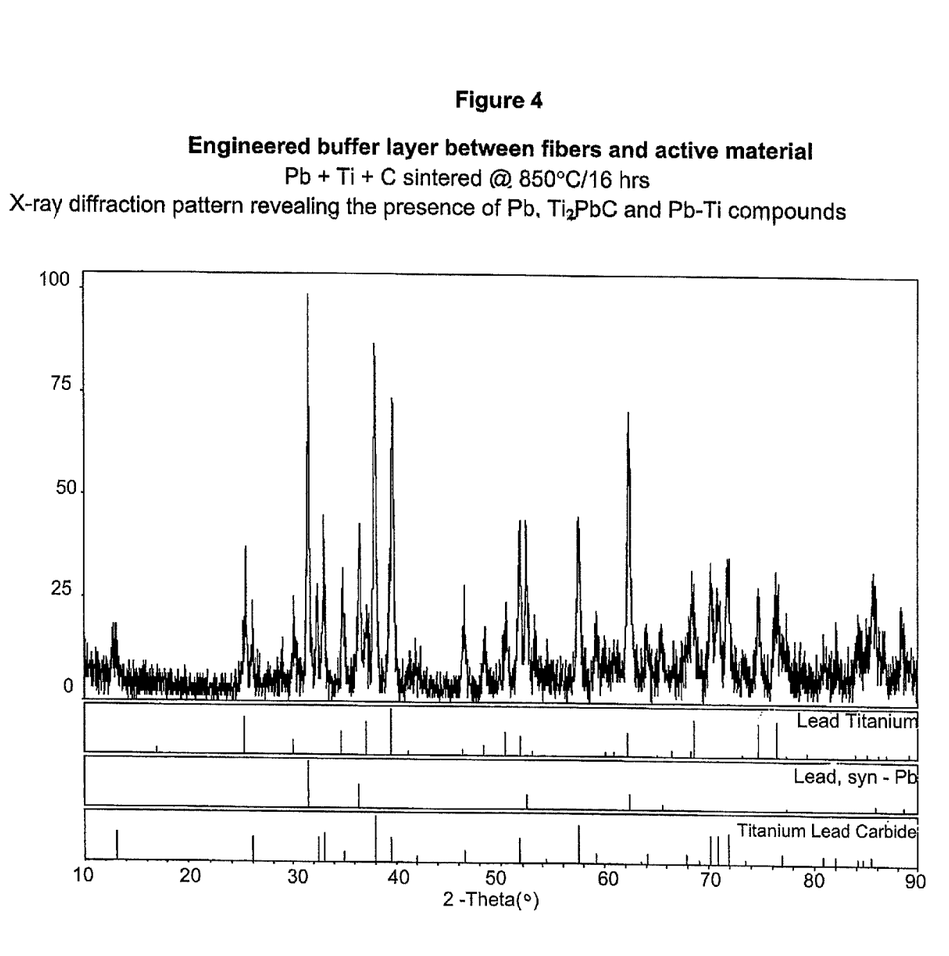
FIG. 4 is an X-ray diffraction pattern revealing the presence of Pb, $Ti_2PbC$ and Pb—Ti compounds on graphite fibers.
Figure 5:
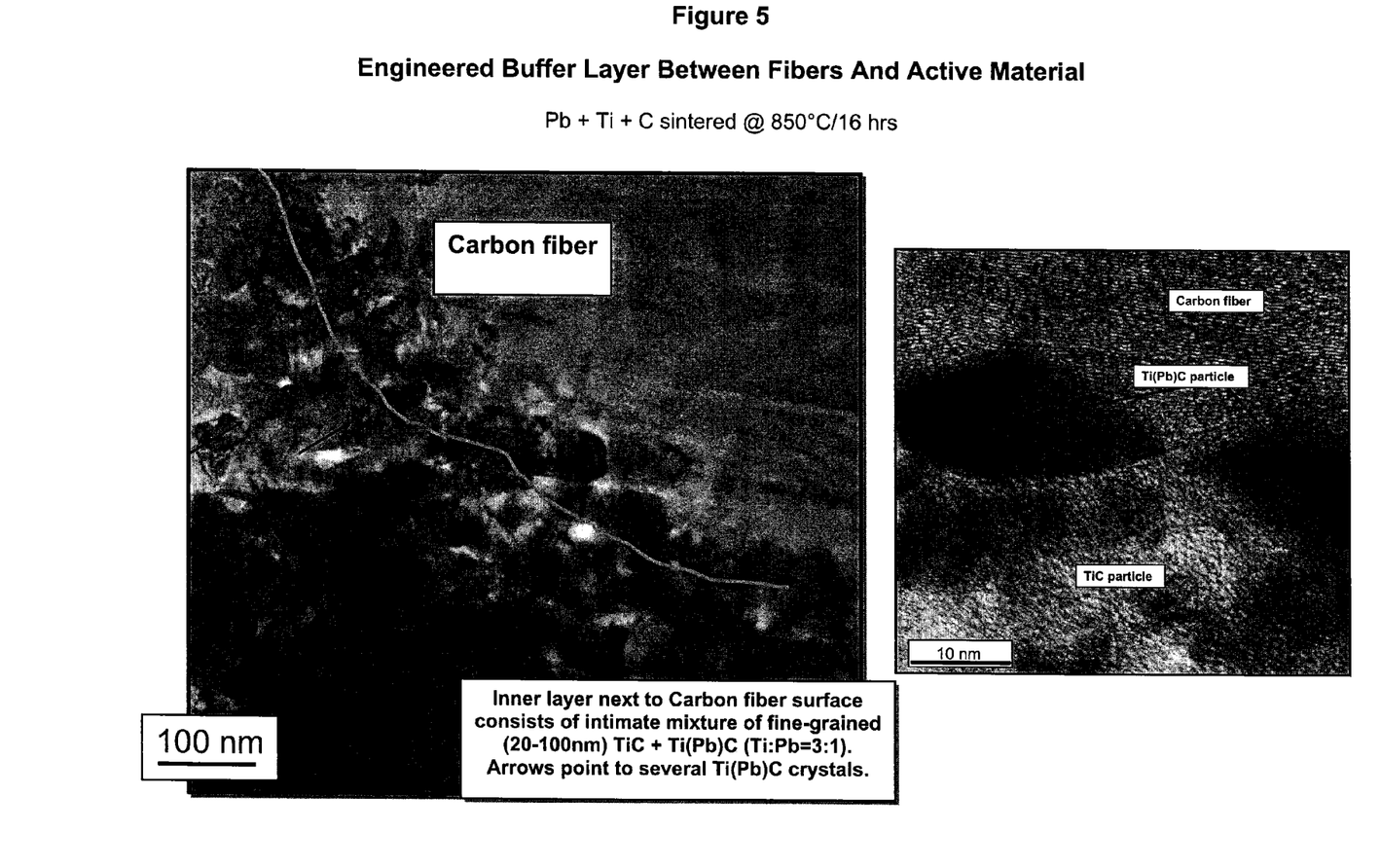
FIG. 5 shows photographs of engineered carbide buffer layers deposited on carbon fibers.
Figure 6:
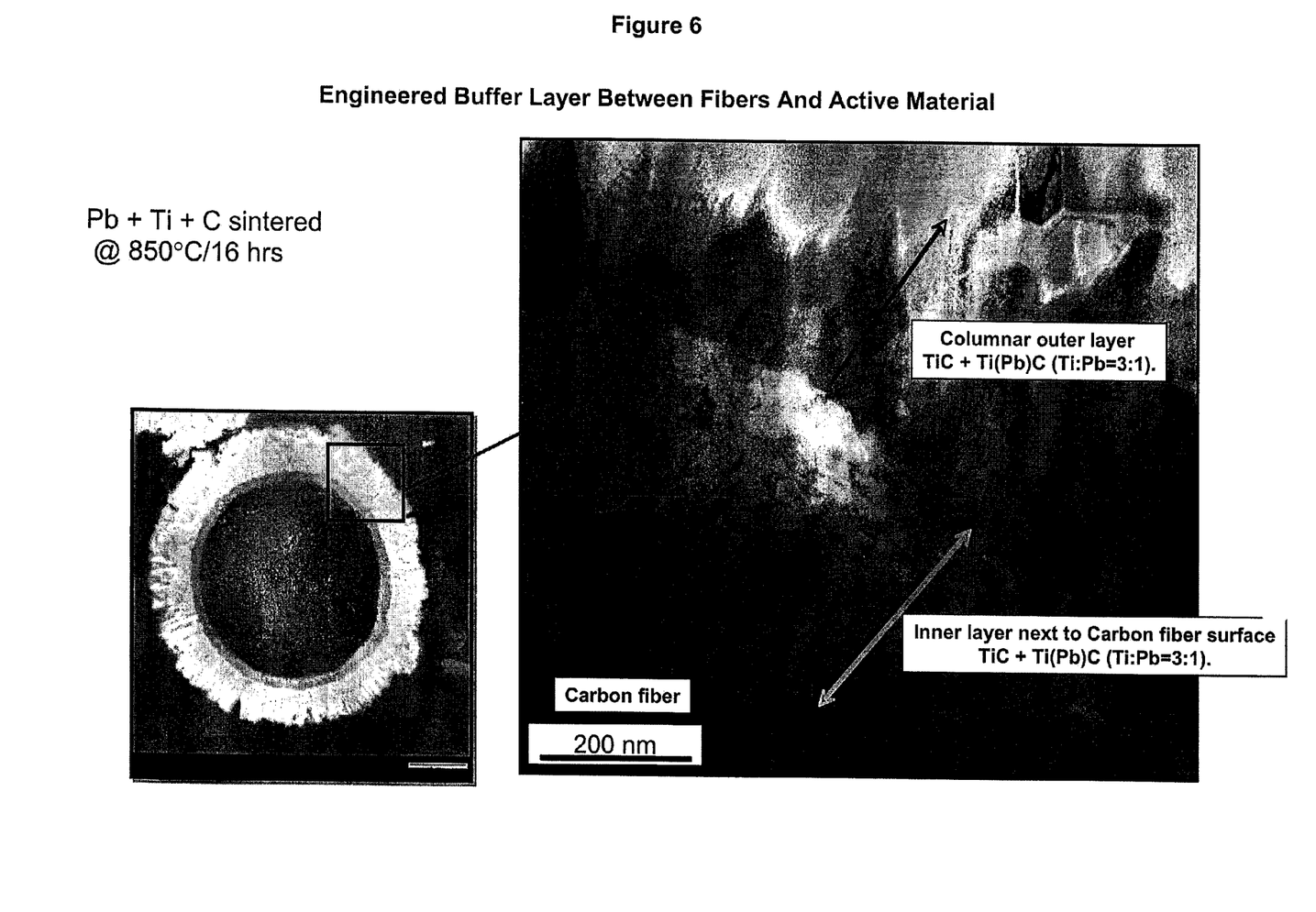
FIG. 6 shows photographs of engineered carbide buffer layers deposited on carbon fibers.
Figure 7:
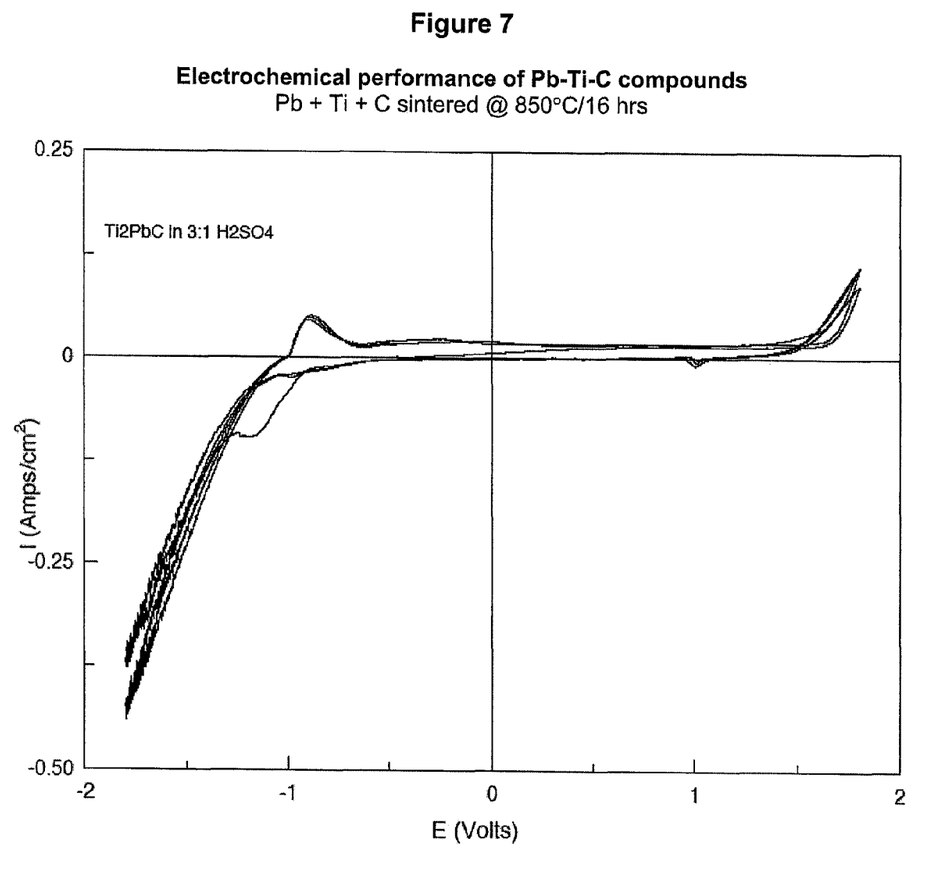
FIG. 7 is a graph showing the electrochemical performance of Pb—Ti—C compounds.

A buffer layer was synthesized onto graphite fibers. FIG. 3 shows photographs of $Ti_2PbC$ synthesized onto graphite fiber. An X-ray diffraction pattern revealed the presence of Pb, $Ti_2PbC$ and Pb—Ti compounds (see FIG. 4.) The photographs of FIG. 5 show an inner layer next to the carbon fiber surface consisting of an intimate mixture of fine-grained (20-100 nm) TiC+Ti(Pb)C (Ti:Pb=3:1). The arrows point to several Ti(Pb)C crystals. The photographs of FIG. 6 show a columnar outer layer of TiC+Ti(Pb)C (Ti:Pb=3:1) and an inner layer next to the carbon fiber surface of TiC+Ti(Pb)C (Ti:Pb=3:1). FIG. 7 shows the electrochemical performance of Pb—Ti—C compounds.

Figure 8:
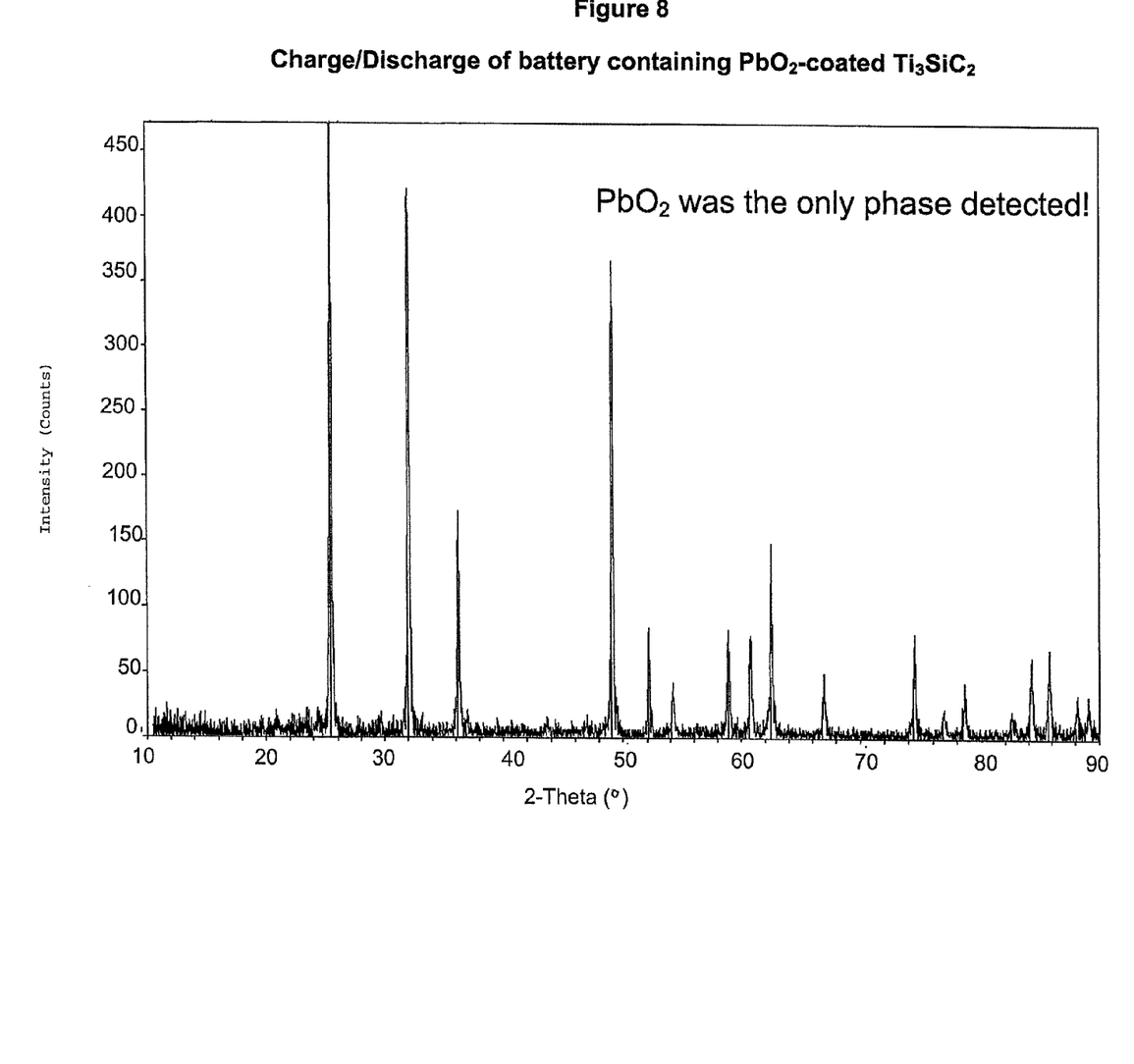
FIG. 8 shows the charge/discharge of battery containing $PbO_2$—coated $Ti_3SiC_2$.

A battery containing $PbO_2$-coated $Ti_3SiC_2$ was prepared. The charge/discharge of the battery containing $PbO_2$-coated $Ti_3SiC_2$ is shown in FIG. 8. Both metallic lead and lead peroxide were electrodeposited onto $Ti_3SiC_2$.

The possibility of fabricating graphite fiber-reinforced $Ti_3SiC_2$ composites has been demonstrated. While the maximum weight reduction can be achieved by depositing optimally thin layers of both the buffer and active material layers onto every fiber, significant weight reductions can also be possible by using graphite fiber-reinforced $Ti_3SiC_2$ plates to replace current lead alloy grids or to fabricate bipolar plates.

Therefore, it can be seen that graphite fibers can be used to replace lead alloys as current collectors for lead-acid batteries, resulting in significant weight savings and large surface area. The use of thin active material layers results in high material utilization and rapid charging times. The use of engineered buffer layers between the fibers and the active materials ensures low ohmic losses and long durability. The invention provides lighter, more durable lead-acid batteries that can improve the efficiency of electric and hybrid vehicles and extend their range. They also can reduce the weight carried by military personnel to operate electronic gear.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims is not limited to the description of the embodiments contained herein.

What is claimed is:

1. An electrode for an electrochemical cell, the electrode comprising:
   a current collector having a buffer layer in contact with the current collector, the buffer layer comprising a ternary carbide; and
   an electrochemically active material in contact with the buffer layer.

2. The electrode of claim 1 wherein:
   the current collector comprises carbon fibers having the buffer layer.

3. The electrode of claim 2 wherein:
   the current collector has a layer of the electrochemically active material in contact with the buffer layer on one side of the current collector, and
   the current collector has a layer of a second electrochemically active material in contact with the buffer layer on an opposite side of the current collector.

4. The electrode of claim 3 wherein:
   the electrochemically active material is metallic lead, and
   the second electrochemically active material is lead peroxide.

5. The electrode of claim 1 wherein:
   the current collector consists essentially of carbon fibers having the buffer layer.

6. The electrode of claim 1 wherein:
   the electrochemically active material is selected from metallic lead or lead peroxide.

7. The electrode of claim 1 wherein:
   the carbide includes lead.

8. The electrode of claim 1 wherein:
   the ternary carbide includes lead and a transition metal.

9. The electrode of claim 8 wherein:
   the transition metal is selected from titanium, zirconium, hafnium, and mixtures thereof.

10. A lead acid battery comprising the electrode of claim 1.

11. An electrode for an electrochemical cell, the electrode comprising:

a current collector having a buffer layer in contact with the current collector, the buffer layer comprising a carbide; and an electrochemically active material in contact with the buffer layer, wherein the carbide includes lead.

12. The electrode of claim 11 wherein:

the current collector comprises carbon fibers having the buffer layer.

13. The electrode of claim 12 wherein:

the current collector has a layer of the electrochemically active material in contact with the buffer layer on one side of the current collector, and the current collector has a layer of a second electrochemically active material in contact with the buffer layer on an opposite side of the current collector.

14. The electrode of claim 13 wherein:

the electrochemically active material is metallic lead, and the second electrochemically active material is lead peroxide.

15. The electrode of claim 11 wherein:

the electrochemically active material is selected from metallic lead or lead peroxide.

16. A lead acid battery comprising the electrode of claim 11.

17. An electrode for an electrochemical cell, the electrode comprising:

a current collector having a buffer layer in contact with the current collector, the buffer layer comprising a carbide; and an electrochemically active material in contact with the buffer layer, wherein the carbide is a ternary carbide including lead and a transition metal.

18. The electrode of claim 17 wherein:

the transition metal is selected from titanium, zirconium, hafnium, and mixtures thereof.

19. The electrode of claim 17 wherein:

the current collector comprises carbon fibers having the buffer layer.

20. The electrode of claim 19 wherein:

the current collector has a layer of the electrochemically active material in contact with the buffer layer on one side of the current collector, and the current collector has a layer of a second electrochemically active material in contact with the buffer layer on an opposite side of the current collector.

21. The electrode of claim 20 wherein:

the electrochemically active material is metallic lead, and the second electrochemically active material is lead peroxide.

22. The electrode of claim 17 wherein:

the electrochemically active material is selected from metallic lead or lead peroxide.

23. A lead acid battery comprising the electrode of claim 17.

* * * * *